United States Patent Office 3,320,230
Patented May 16, 1967

3,320,230
PROCESS FOR SEPARATING CARBOXYLIC ACIDS
Edward James Bennett, Newark, Del., assignor to E. I. du Pont de Nemours and Company, Wilmington, Del., a corporation of Delaware
No Drawing. Filed Apr. 26, 1963, Ser. No. 276,073
3 Claims. (Cl. 260—419)

The present invention is directed to a process for the separation of organic acids. More particularly, the present invention is directed to a process for separating unsubstituted aliphatic monocarboxylic acids and haloaliphatic monocarboxylic acids from polycarboxylic acids and hydroxy, keto, mercapto and sulfo substituted aliphatic mono and polycarboxylic acids.

There are a number of industrial situations where mixtures of acid products are obtained and it is desired to effect a separation of the acid components of these mixtures. Although there are specific methods available for the separation of carboxylic acids in individual cases, no method of separating organic acids has yet been devised which is simple to operate or very general in application.

It is, therefore, an object of this invention to provide a novel process for separating unsubstituted and haloaliphatic monocarboxylic acids from polycarboxylic acids and hydroxy, amino, keto, mercapto and sulfo aliphatic mono and polycarboxylic acids.

This and other objects will become apparent from the following description and claims.

More specifically, the present invention is directed to a process for separating (a) at least one member of the group consisting of alkane monocarboxylic acids, alkene monocarboxylic acids, haloalkane monocarboxylic and haloalkene monocarboxylic acid from a mixture containing the monocarboxylic acids of group (a) and (b) at least one member of the group consisting of unsubstituted aliphatic polycarboxylic acids, hydroxyaliphatic mono and polycarboxylic acids, aminoaliphatic mono and polycarboxylic acids, ketoaliphatic mono and polycarboxylic acids, haloaliphatic polycarboxylic acids, and sulfoaliphatic mono and polycarboxylic acids, said members of group (a) containing up to 18 carbons and said members of group (b) containing up to 22 carbons, which process comprises treating a mixture of such carboxylic acids with a liquid halofluoroalkane chosen from the group consisting of trichlorotrifluoroethane, monofluorotrichloromethane, dichlorotetrafluoroethane, monofluorodichloromethane, monochlorodifluoromethane and dibromotetrafluoroethane, separating the halofluoroalkane solution containing the dissolved carboxylic acids of group (a) from the undissolved carboxylic acids of group (b) and removing said halofluoroalkane from said solution to recover said carboxylic acids of group (a).

The present process consists of treating a mixture of carboxylic acids with certain halofluoroalkanes, removing the halofluoroalkane solution containing the soluble acids dissolved therein, thereby recovering the insoluble acids, and then evaporating or otherwise removing the halofluoroalkane to recover the soluble acids. The soluble acids comprise alkane carboxylic acids R—$CO_2H$ where R is hydrogen or an alkyl group of one to 17 carbons, alkene carboxylic acids R'$CO_2H$ where R' is an alkene group containing from two to 17 carbons, haloalkane monocarboxylic acids and haloalkene monocarboxylic acids R"$CO_2H$ where R" is a halogen substituted alkane or alkene group of up to 17 carbons.

The insoluble acids comprise unsubstituted aliphatic polycarboxylic acids containing from two to 22 carbons and having at least two carboxyl groups and hydroxyaliphatic, aminoaliphatic, ketoaliphatic, mercaptoaliphatic or sulfoaliphatic mono and polycarboxylic acids containing from two to 22 carbons and having at least one carboxylic acid group.

Representative examples of the acids which are soluble in the halofluoroalkanes of this invention are formic acid, acetic acid, propionic acid, butyric acid, valeric acid, caproic acid, caprylic acid, pelargonic acid, capric acid, lauric acid, tridecylic acid, myristic acid, pentadecylic acid, palmitic acid, stearic acid, acrylic acd, methacrylic acid, crotonic acid, undecylic acid, vinyl acetic acid, tiglic acid, linoleic acid, linolenic acid, oleic acid, chloroacetic acid, trichloroacetic acid, iodoacetic acid, chloropropionic acid, bromopropionic acid, iodopropionic acid, bromobutyric acid, chlorocaproic acid, dibromoundecanoic acid, chloropalmitic acid, dibromostearic acid and $\alpha$-chloroacrylic acid.

Representative examples of the acids which are insoluble in the halofluoroalkanes of this invention are oxalic acid, malonic acid, succinic acid, glutaric acid, adipic acid, glutaconic acid, pimelic acid, suberic acid, azelaic acid, sebacic acid, fumaric acid, maleic acid, itaconic acid, diglycolic acid, tricarballylic acid, muconic acid, camphoric acid, malic acid, tartaric acid, citric acid, hydroxystearic acid, glycolic acid, aconitic acid, acetonic acid, hydroxybutyric acid, hydroxycaproic acid, hydroxycaprylic acid, hydroxyglutaric acid, lactic acid, hydracrylic acid, pyruvic acid, levulinic acid, ketobutyric acid, glyoxalic acid, acetoacetic acid, acetone dicarboxylic acid, ketostearic acid, sulfoacetic acid, sulfosuccinic acid, glycine, alanine, valine, leucine, arginine, aspartic acid, glutamic acid, lysine, betaine hydrochloride, isoleucine, threonine, methionine, serine, norleucine, proline, hydroxyproline, cystine, cysteine and citrulline.

The present novel process contains three essential steps. These steps are (1) treating a mixture of aliphatic organic acids with a halofluoroalkane, (2) separating the halofluoroalkane solution containing the acids which are soluble in the halofluoroalkane from the undissolved acids and (3) removing the halofluoroalkane to recover the soluble acids. Step (1) is carried out in any convenient manner which allows contacting the mixture of acids with the halofluoroalkane until all of the soluble acids have dissolved. For example, the halofluoroalkane-acid mixture may be stirred in a suitable vessel. If the acid mixture is liquid, countercurrent extraction may be used with the usually more dense halofluoroalkane. If the acid mixture is solid, extraction with a fixed bed or column is useful. In operations such as the latter two, steps (1) and (2) are accomplished at the same time. All of these operations are well known to the art.

If step (1) does not result in separation of the undissolved material from the solution, filtration or decantation may be used, whichever is appropriate. Removal of the solvent from the solution in step (3) may be accomplished by evaporation, distillation, vacuum evaporation or other art methods. Vacuum evaporation is particularly useful with heat sensitive materials such as certain haloacids.

Step (1) is usually carried out at or near room temperature (25° C.) but higher or lower temperatures may be used when required. Sealed equipment is required with the halofluoroalkanes which have boiling points below room temperature at atmospheric pressure. Of course, the halofluoroalkane must be liquid at the treatment temperature which is used. Although not required for the successful operation of this process, the halofluoroalkane is usually recovered during step (3) for economic reasons. All of the halofluoroalkanes are readily recovered by well known methods; for example, adsorption or condensation with refrigerated condensers.

Six halofluoroalkanes are known to be useful in this process. These are 1,1,2-trichloro-1,2,2-trifluoroethane, 1,2 - dichlorotetrafluoroethane, monofluorodichloromethane, monochlorodifluoromethane, monofluorotrichloromethane and 1,2-dibromotetrafluoroethane. Other halofluoroalkanes such as dichlorodifluoromethane, monochlorotrifluoromethane, difluorotetrachloroethane and octafluorocyclobutane, as well as haloalkanes such as carbon tetrachloride, chloroform and the like, are not useful in this process because they either do not dissolve sufficient acids of any type ($CF_2Cl_2$, $CF_3Cl$, perfluorocyclobutane) or they dissolve all types. It is apparent that relatively pure materials result only when the solvent dissolves one material but very little of the other. The upper limit of solubility set on the insoluble acids is 0.1% by weight. The minimum solubility of the soluble acids is about 1% by weight. Thus the minimum purity will be 1 part impurities in 10 parts product and usually it is greater than 1 part impurities in 500 parts product.

There are many processes which result in mixtures of carboxylic acids, either as products or unconverted starting materials. These mixtures may be separated using the present process if the mixture contains acids of the two different types heretofore defined. For example, oxidation of unsaturated compounds such as oleic acid, linoleic acid, linolenic acid, certain terpines and the like leads to mixtures of mono and polycarboxylic acids; e.g., Oleic acid→pelargonic acid+azelaic acid
Linoleic acid→caproic acid+malonic acid+azelaic acid
Linolenic acid→propionic acid+malonic acid+azelaic acid These mixtures of mono and polycarboxylic acids may be separated by the present process. Halo acids react with ammonia to form amino acids and with hydroxides to form hydroxy acids, the haloacids being easily separated from the products by the present process. Other well known processes which give products which may be separated by the present process are conversion of haloacids to sulfoacids with bisulfite and conversion of dibasic acids to trifluoromethyl monoacids with sulfur tetrafluoride. A large number of other well known processes which result in mixtures of carboxylic acids where separation is desired will be apparent to those skilled in the art.

The following examples are representative and illustrate the separations of mixtures of acids produced by commercially important processes. All parts are by weight unless otherwise specified.

EXAMPLE 1

Treatment of oleic acid with ozone and then cleavage of the resulting ozonide gives a mixture of oleic acid [$CH_3(CH_2)_7CH=CH(CH_2)_7CO_2H$], pelargonic acid [$CH_3(CH_2)_7CO_2H$] and azelaic acid

[$HO_2C(CH_2)_7CO_2H$]

In a typical procedure ozonolysis of oleic acid is 90% complete, resulting in a mixture consisting of 0.1 mole oleic acid (5.26 mole percent), 0.9 mole pelargonic acid (47.3 mole percent) and 0.9 mole azelaic acid (47.3 mole percent). One hundred parts of such mixture were added to 100 parts of 1,1,2-trichloro-1,2,2-trifluoroethane and the resulting mixture was agitated for 15 minutes at room temperature. The undissolved solids were collected by filtration. The solids proved to be essentially pure azelaic acid. Evaporation of the solvent gave a mixture of oleic and pelargonic acids containing less than 0.6 mole percent azelaic acid.

EXAMPLE 2

Oxidation of linoleic acid

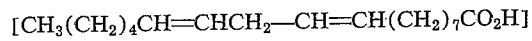

at 90% conversion yields a mixture containing 0.1 mole (3.58 mole percent) linoleic acid, 0.9 mole (32.14 mole percent) malonic acid, 0.9 mole (32.14 mole percent) caproic acid and 0.9 mole (32.14 mole percent) azelaic acid. One hundred parts of such mixture were added to 100 parts of 1,1,2-trichloro-1,2,2-trifluoroethane and the resulting mixture was agitated for 15 minutes at room temperature. The remaining solids were collected by filtration and proved to be essentially a mixture of malonic and azelaic acid. The solvent was evaporated from the filtrate, leaving a mixture of linoleic and caproic acids containing about 1 mole percent dibasic acids.

EXAMPLE 3

Treatment of α-bromopropionic acid with ammonia results in a mixture of this acid with alanine (α-aminopropionic acid). At 90% conversion the mixture consists of 16 weight percent α-bromoacid and 84 weight percent aminoacid. Twenty-five parts of such mixture were added to 100 parts of 1,1,2-trichloro-1,2,2-trifluoroethane and the resulting mixture was agitated for 15 minutes at room temperature. The remaining solids were collected by filtration. The solids in the filter cake proved to be 98.4% alanine and 1.6% α-bromopropionic acid, a reduction of 90%.

Evaporation of the filtrate gave essentially pure α-bromopropionic acid.

When the above procedure was repeated using monofluorotrichloromethane, the undissolved solids collected as the filter cake contained 1.1% α-bromopropionic acid.

EXAMPLE 4

One hundred parts of a mixture consisting of equal weights of bromobutyric acid (54.1 mole percent) and bromosuccinic acid (45.9 mole percent) were agitated with 60 parts of 1,1,2-trichloro-1,2,2-trifluoroethane at room temperature for 15 minutes. The remaining solids were collected by filtration, dried and found to be 89.5 mole percent bromosuccinic acid and 10.5 mole percent bromobutyric acid. Evaporation of the solvent from the filtrate gave 99.4 mole percent bromobutyric acid and 0.6 mole percent bromosuccinic acid.

EXAMPLE 5

Thermal dehydration of β-hydroxybutyric acid

[$CH_3CHOHCH_2CO_2H$]

gives crotonic acid [$CH_3CH=CHCO_2H$]. At 90% conversion the resulting mixture contains 11.8% by weight β-hydroxybutyric acid and 88.2% by weight crotonic acid. Extraction of such mixture with 1,1,2-trichloro-1,2,2-trifluoroethane in a countercurrent, liquid-liquid extraction apparatus where the mixture of acids was the ascending phase and trichlorotrifluoroethane the descending phase gave essentially pure β-hydroxybutyric acid and a trichlorotrifluoroethane solution of essentially pure crotonic acid, the latter being isolated by evaporation of the solvent.

EXAMPLE 6

Careful oxidation of either angelic or tiglic acids [cis and trans $CH_3CH=C(CH_3)CO_2H$] gives a mixture containing 59.4% by weight pyruvic acid and 40.6% by weight acetic acid. Using a countercurrent, liquid-liquid extraction procedure as in Example 5, this mixture was extracted with 1,1,2-trichloro-1,2,2-trifluoroethane as the descending phase. Essentially pure pyruvic acid and a solution of essentially pure acetic acid in trichlorotrifluoroethane were obtained from the extraction. Acetic acid was isolated by evaporation of the solvent.

EXAMPLE 7

Reaction of acetic anhydride with concentrated sulfuric acid gives a mixture containing 30% by weight acetic acid and 70% by weight sulfoacetic acid [$HO_3SCH_2CO_2H$]. One hundred parts of such mixture were agitated with 75 parts of 1,1,2-trichloro-1,2,2-trifluoroethane for 15 minutes at room temperature. The mixture was then filtered. The filter cake was essentially pure sulfoacetic acid. Evaporation of the filtrate gave acetic acid containing less than 0.3% by weight sulfoacetic acid.

EXAMPLE 8

Fifty parts of a mixture containing 5.26 mole percent oleic acid, 47.37 mole percent pelargonic acid and 47.37 mole percent azelaic acid and 65 parts of 1,2-dibromotetrafluoroethane were mixed together at room temperature for 15 minutes and then allowed to settle for a short time. The mixture was then separated by filtration at room temperature. The solvent was evaporated from the filtrate. The filter cake consisted of azelaic acid containing less than 1.0 mole percent oleic acid and pelargonic acid. The filtrate residue consisted of oleic and pelargonic acids containing less than 0.5 mole percent azelaic acid.

EXAMPLE 9

Twenty parts of the acid mixture of Example 8 and 40 parts of 1,2-dichlorotetrafluoroethane were loaded into a cooled glass pressure tube and then agitated for 15 minutes. A disk of filter paper was sealed beneath the outlet valve of the vessel. A second vessel was evacuated and connected to the first vessel. The liquid solution was allowed to flow from the first to the second vessel through the filter paper. The solids remaining in the first vessel on the filter paper were shown to be azelaic acid containing less than 0.8 mole percent oleic and pelargonic acids. The solvent was evaporated from the second vessel. The residue was oleic and pelargonic acids containing less than 0.72 mole percent azelaic acid.

EXAMPLE 10

Thirty-five parts of the acid mixture of Example 8 and 50 parts of dichloromonofluoromethane were added to a pressure vessel cooled in ice-water. The mixture was agitated for 15 minutes, then separated by filtration through a jacketed filter cooled with ice-water. The filter cake was found to be azelaic acid containing less than 1.0 mole percent oleic and pelargonic acids. Evaporation of the solvent from the filtrate gave a residue consisting of oleic and pelargonic acids containing less than 0.68 mole percent azelaic acid.

EXAMPLE 11

Fifteen parts of the acid mixture of Example 8 and 37 parts of monochlorodifluoromethane were added to a glass pressure vessel cooled in liquid nitrogen. A disk of filter paper was sealed beneath the outlet valve. The vessel was sealed and allowed to come to room temperature where it was agitated for 15 minutes. A second evacuated pressure vessel was attached to the first. The second vessel was cooled in liquid nitrogen and the liquid in the first vessel was allowed to flow into the second. The second vessel was then disconnected and the solvent allowed to evaporate. The residue was found to be oleic and pelargonic acids containing less than 0.35 mole percent azelaic acid. The solid residue remaining in the first vessel was found to be azelaic acid containing less than 0.5 mole percent oleic and pelargonic acids.

It should be noted in Examples 9, 10 and 11 that the solvents having boiling points below room temperature at atmospheric pressure and hence these examples involved the use of pressure equipment.

To further illustrate the usefulness of the present process, the solubilities of some representative acids in the halofluoroalkanes of the present invention are listed below.

(A) SOLUBLE ACIDS
[Solubility in parts/100 parts solvent]

| Acid | Solvent | | | | | |
|---|---|---|---|---|---|---|
| | $CF_2ClCFCl_2$ | $CFCl_3$ | $CF_2ClCF_2Cl$ | $CHCl_2F$ | $CHClF_2$ | $CF_2BrCF_2Br$ |
| $HCO_2H$ (80%) | ca. 5 | | | | | |
| $CH_3CO_2H$ | >50 | | | | | |
| $CH_3CH_2CO_2H$ | >60 | | | | | |
| $CH_3(CH_2)_2CO_2H$ | >50 | >60 | >60 | | >60 | >60 |
| $(CH_3)_2CHCH_2CO_2H$ | >50 | >50 | | | | |
| $CH_3(CH_2)_4CO_2H$ | >50 | | | | | |
| $CH_3(CH_2)_5CO_2H$ | >50 | | | | | |
| $CH_3(CH_2)_7CO_2H$ | >60 | >50 | >60 | >50 | >60 | >60 |
| $CH_3(CH_2)_8CO_2H$ | >50 | | | | | |
| $CH_3(CH_2)_{10}CO_2H$ | 35–40 | 45–50 | 5–8 | >50 | >30 | ca. 40 |
| $CH_3(CH_2)_{12}CO_2H$ | 5–7 | 25–30 | ca. 1 | | ca. 20 | ca. 10 |
| $CH_3(CH_2)_{14}CO_2H$ | 1–3 | 10–13 | ca. 1 | >15 | ca. 10 | ca. 5 |
| $CH_3(CH_2)_{16}CO_2H$ | 2–3 | 15–20 | ca. 1 | >15 | ca. 10 | ca. 5 |
| Linoleic $CH_3(CH_2)_4(CH=CHCH_2)_2$ | >50 | | | | | |
| Oleic $CH_3(CH_2)_7CH=CH(CH_2)_7CO_2H$ | >60 | >60 | >50 | >50 | >50 | >60 |
| $ClCH_2CO_2H$ | ca. 10 | | | | | |
| $Cl_3CCO_2H$ | 20–30 | | | | | |
| $CH_2ICO_2H$ | ca. 5 | | | | | |
| $C_2H_4ClCO_2H$ | 10–20 | >50 | | | | |
| $C_2H_4BrCO_2H$ | 1–5 | 5–20 | | | | |
| $C_2H_4ICO_2H$ | ca. 1 | ca. 5 | | | | |
| $C_3H_6BrCO_2H$ | >60 | | | | | |
| Linolenic $CH_3(CH_2CH=CH)_3(CH_2)_7CO_2H$ | >50 | >50 | | | | |

(B) INSOLUBLE ACIDS

[Solubility in parts/100 parts of solvent]

| Acid | $CF_2ClCFCl_2$ | $CFCl_3$ | $CF_2ClCF_2Cl$ | $CHCl_2F$ | $CHClF_2$ | $CF_2BrCF_2Br$ |
|---|---|---|---|---|---|---|
| Oxalic | <0.01 | <0.01 | | | <0.01 | <0.01 |
| Malonic | <0.01 | <0.01 | | | | |
| Succinic | <0.01 | | | | | |
| Glutaric | <0.01 | | | | | |
| Adipic | <0.01 | <0.01 | <0.01 | <0.01 | <0.01 | <0.01 |
| Pimelic | <0.01 | | | | | |
| Suberic | <0.01 | | <0.01 | <0.01 | | |
| Azelaic | <0.01 | <0.01 | <0.01 | <0.01 | <0.01 | <0.01 |
| Sebacic | <0.01 | | | | | |
| Fumaric | <0.1 | <0.1 | | | | |
| Maleic | <0.1 | | | | | |
| Itaconic | <0.1 | | | | | |
| Sorbic | <0.1 | | | | | |
| Dibromosuccinic | <0.1 | <0.1 | | | | |
| Malic | <0.1 | | | | | |
| Tartaric | <0.1 | <0.1 | | | | |
| Citric | <0.1 | <0.1 | | | | |
| Hydroxystearic | <1 | | | | | |
| Pyruvic | <0.1 | | | | | |
| Levulinic | <1 | <0.5 | | | | |
| Sulfoacetic | <0.1 | | | | | |
| Mercaptosuccinic | <0.1 | <0.1 | | | | |
| Glycine | <0.1 | <0.1 | | | | |
| Alanine | <0.1 | | | | | |
| Valine | <0.1 | | | | | |
| Leucine | <0.1 | | | | | |
| Arginine hydrochloride | <0.1 | <0.1 | | | | |
| Aspartic | <0.1 | | | | | |
| Glutamic | <0.1 | | | | | |
| Betaine hydrochloride | <0.1 | | | | | |
| Diglycolic | <0.1 | | | | | |

The above solubility data illustrates the complete distinction which exists between the two classes of carboxylic acids heretofore defined as to their solubility in halofluoroalkane. It is surprising and unexpected that such complete distinction exists between these classes of carboxylic acids.

It should be understood that the preceding examples are representative and that said examples may be varied within the scope of the total specification, as understood by one skilled in the art, to produce essentially the same results. It should also be understood that mixtures of acids from any source which contain both soluble and insoluble acids as hereinbefore defined may be separated by the process of the present invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for separating at least one member of class (A) consisting of monocarboxylic acids having up to 18 carbon atoms and selected from the group consisting of alkane, alkene, haloalkane and haloalkene from a mixture containing said monocarboxylic acid of (A) and at least one organic acid of class (B) having up to 6 carbon atoms and selected from the group consisting of hydroxyaliphatic monocarboxylic acid, aminoaliphatic monocarboxylic acid, ketoaliphatic monocarboxylic acid and sulfoaliphatic monocarboxylic acid, which process comprises treating said mixture with a liquid halofluoroalkane selected from the group consisting of 1,1,2-trichloro-1,2,2-trifluoroethane, monofluorotrichloromethane, 1,2-dichlorotetrafluoroethane, monofluorodichloromethane, monochlorodifluoromethane and 1,2-dibromotetrafluoroethane, then separating said halofluoroalkane containing the dissolved monocarboxylic acid of class (A) from the undissolved substituted monocarboxylic acid of class (B) and recovering said monocarboxylic acid of class (A) from said halofluoroalkane.

2. The process of claim 1 wherein the halofluoroalkane is 1,1,2-trichloro-1,2,2-trifluoroethane.

3. The process of claim 1 wherein the halofluoroalkane is monofluorotrichloromethane.

References Cited by the Examiner

UNITED STATES PATENTS 2,841,601   7/1958   Hill et al. _____ 260—419 X

CHARLES B. PARKER, *Primary Examiner.*

IRVING MARCUS, ANTON H. SUTTO, *Examiners.*